US012724563B2

(12) United States Patent
Aquil et al.

(10) Patent No.: US 12,724,563 B2
(45) Date of Patent: Sep. 1, 2026

(54) COMMAND BUS TRAINING FOR MEMORY SYSTEM

(71) Applicant: QUALCOMM Incorporated, San Diego, CA (US)

(72) Inventors: Farrukh Aquil, San Diego, CA (US); Boris Dimitrov Andreev, San Diego, CA (US); Joon Young Park, San Diego, CA (US); Vishal Mishra, San Diego, CA (US); Yong Xu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 7 days.

(21) Appl. No.: 18/644,294

(22) Filed: Apr. 24, 2024

(65) Prior Publication Data

US 2025/0077113 A1 Mar. 6, 2025

Related U.S. Application Data

(60) Provisional application No. 63/535,291, filed on Aug. 29, 2023.

(51) Int. Cl.
*G06F 11/00* (2006.01)
*G06F 3/06* (2006.01)
*G06N 20/00* (2019.01)

(52) U.S. Cl.
CPC ............ *G06F 3/0655* (2013.01); *G06F 3/061* (2013.01); *G06F 3/0673* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,203,875 | B1 | 2/2019 | Ying et al. | |
| 11,907,568 | B2 * | 2/2024 | Jung | G06F 3/064 |
| 12,026,393 | B2 * | 7/2024 | Lee | G06F 3/0604 |
| 2012/0250433 | A1 | 10/2012 | Jeon | |
| 2014/0189224 | A1 | 7/2014 | Kostinsky et al. | |
| 2019/0018737 | A1 * | 1/2019 | Kim | G06F 11/1004 |
| 2019/0042519 | A1 * | 2/2019 | Jue | G06F 3/0659 |
| 2019/0129782 | A1 | 5/2019 | Lee | |
| 2020/0110716 | A1 * | 4/2020 | Mozak | G06F 18/214 |
| 2020/0133542 | A1 | 4/2020 | Kim et al. | |
| 2022/0206717 | A1 | 6/2022 | Kim et al. | |
| 2022/0244863 | A1 * | 8/2022 | Bhatia | G11C 29/028 |

(Continued)

OTHER PUBLICATIONS

International Search Report and Written Opinion—PCT/US2024/036504—ISA/EPO—Oct. 2, 2024.

*Primary Examiner* — Mujtaba M Chaudry
(74) *Attorney, Agent, or Firm* — Harrity & Harrity, LLP

(57) ABSTRACT

Various aspects of the present disclosure generally relate to memory devices. In some aspects, a volatile memory device may receive, from a host device, a clock (CK) signal. The memory device may receive, from the host device, a command address (CA) signal associated with a continuous long burst pseudo-random binary sequence (PRBS) pattern. The memory device may perform a command bus training (CBT) based at least in part on the CA signal in relation to the CK signal. The memory device may provide, to the host device, pass or fail results associated with the CBT. Numerous other aspects are described.

26 Claims, 9 Drawing Sheets

(56) References Cited

U.S. PATENT DOCUMENTS

| | | | | |
|---|---|---|---|---|
| 2022/0246183 | A1* | 8/2022 | Bloemer | G11C 7/1093 |
| 2023/0197129 | A1 | 6/2023 | Song | |
| 2023/0297523 | A1 | 9/2023 | Mozak et al. | |
| 2024/0046975 | A1 | 2/2024 | Um et al. | |
| 2024/0070101 | A1* | 2/2024 | Verna-Ketel | G06F 13/4027 |
| 2024/0211135 | A1* | 6/2024 | Lee | G06F 3/0653 |
| 2024/0371460 | A1* | 11/2024 | Jhaveri | G11C 29/56016 |
| 2025/0021875 | A1* | 1/2025 | Choi | G06N 20/00 |

* cited by examiner

400

500

600

COMMAND BUS TRAINING FOR MEMORY SYSTEM

CROSS-REFERENCE TO RELATED APPLICATION

This Patent application claims priority to U.S. Provisional Patent Application No. 63/535,291, filed on Aug. 29, 2023, entitled "COMMAND BUS TRAINING FOR MEMORY SYSTEM," and assigned to the assignee hereof. The disclosure of the prior Application is considered part of and is incorporated by reference into this Patent Application.

FIELD OF THE DISCLOSURE

Aspects of the present disclosure generally relate to memory systems and specifically, to techniques and apparatuses for command bus training (CBT) for memory system.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

SUMMARY

Some aspects described herein relate to a volatile memory device, comprising: one or more components configured to: receive, from a host device, a clock (CK) signal; receive, from the host device, a command address (CA) signal associated with a continuous long burst pseudo-random binary sequence (PRBS) pattern; perform a command bus training (CBT) based at least in part on the CA signal in relation to the CK signal; and provide, to the host device, pass or fail results associated with the CBT.

Some aspects described herein relate to a method, comprising: receiving, by a volatile memory device and from a host device, a CK signal; receiving, by the volatile memory device and from the host device, a CA signal associated with a continuous long burst PRBS pattern; performing, by the volatile memory device, a CBT based at least in part on the CA signal in relation to the CK signal; and providing, by the volatile memory device and to the host device, pass or fail results associated with the CBT.

Some aspects described herein relate to a system, comprising: a host device configured to: transmit a CK signal; and transmit a CA signal associated with a continuous long burst PRBS pattern; and a memory device configured to: receive the CK signal; receive the CA signal; perform a CBT based at least in part on the CA signal in relation to the CK signal; and provide pass or fail results associated with the CBT.

Aspects generally include a method, apparatus, system, computer program product, non-transitory computer-readable medium, memory device, or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
FIG. 1 is a diagram illustrating an example system capable of command bus training (CBT) for a memory system.
Figure 1:
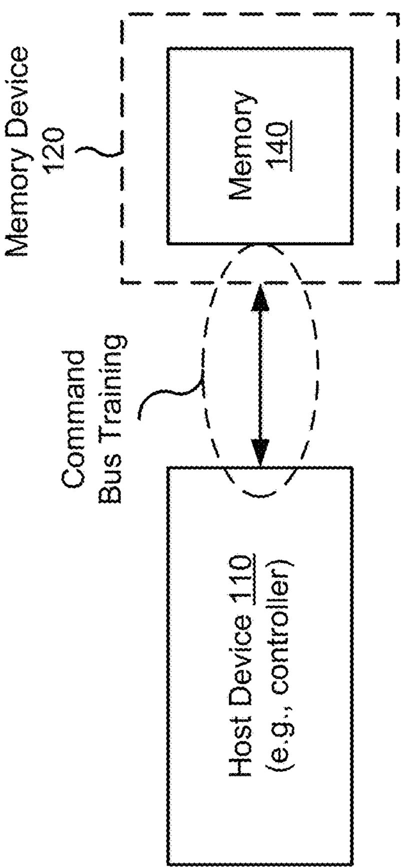

A memory device may receive a command from a host device (e.g., controller or memory controller) via a command bus, which may be trained to ensure that signaling between the memory device and the host device satisfies an expected standard. Training may be performed to improve an accuracy of signaling. For example, the training may involve adjusting sender and/or receiver signaling properties of the host device and/or the memory device based on optimizing a training target. A signal accuracy may be characterized by finding a middle or center of a signal eye. A command bus timing may be trained to be in the middle or center of the signal eye for optimal performance.

Low-power double data rate (LPDDR) may be a type of memory consuming relatively low power and targeted for mobile devices. An LPDDR may be associated with a maximum density (bits), a memory array clock, a prefetch size, memory densities, an input/output (I/O) bus clock frequency, a data transfer rate, a supply voltage, and/or a command/address bus. LPDDR 5 (LPDDR5) may support a maximum speed of approximately 2.4 gigabits per second (Gbps), whereas LPDDR 6 (LPDDR6) may support a maximum speed of approximately 6.4 Gbps.

A command bus training (CBT) may be used to ensure that a clock (CK) signal is at the center of command address (CA) bits (data of command). The CBT may involve sending only a phase (or portion) of data (e.g., phase 0 or phase 1). CBT may involve two phases of training, which may correspond to phase 0 and phase 1. The data may be on the rising edge of the CK or on the falling edge of the CK. The data may be relatively long, for example, due to a back-to-back data burst. The limitation of only sending the phase (or portion) of data each time may result in less exhaustive training, which may be acceptable for the relatively low speed associated with LPDDR5. However, for LPDDR6, which may be associated with a higher speed than LPDDR5, such an approach may lead to improper training. Rise edge training and fall edge training may not be suitable for the relatively high speed associated with LPDDR6. As a result, applying the CBT to LPDDR6 may degrade an overall system performance.

Various aspects relate generally to CBT training for memory devices. In some aspects, a memory device, such as a volatile memory device, may receive, from a host device, a CK signal. The volatile memory device may receive, from the host device, a CA signal associated with a continuous long burst pseudo-random binary sequence (PRBS) pattern. The volatile memory device may perform a CBT based at least in part on the CA signal in relation to the CK signal. The CBT may be performed on a per-bit basis and/or a per-phase basis of the CA signal. The volatile memory device may provide pass/fail results associated with the CBT. The pass/fail results may include, in parallel, pass/fail information on the per-bit basis. The pass/fail results may include rise and fall pass/fail information on the per-phase basis.

Particular aspects of the subject matter described in this disclosure can be implemented to realize one or more of the following potential advantages. In some examples, by implementing the continuous long burst PRBS pattern for the CA signal, a coverage may be improved for LPDDR6 CBT. The continuous long burst PRBS pattern may address inter-symbol interference (ISI), cross-talk, and/or voltage noise. The continuous long burst PRBS pattern may be suitable for the relatively high speed associated with LPDDR6 (e.g., 6.4 Gbps), versus the relatively low speed associated with LPDDR5 (e.g., 2.4 Gbps) which does not implement the continuous long burst PRBS pattern. As a result, by using the continuous long burst PRBS pattern, a training associated with LPDDR6 may be improved, thereby improving an overall system performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

FIG. 1 is a diagram illustrating an example system 100 capable of implementing CBT for the system 100. The system 100 may include one or more devices, apparatuses, and/or components for performing operations described herein. For example, the system 100 may include a host device 110 (e.g., a controller or memory controller) and a memory device 120. The memory device 120 may include memory 140. The host device 110 may communicate with the memory device 120 via an interface.

In some implementations, one or more systems, devices, apparatuses, components, and/or controllers of FIG. 1 may be configured to receive a CK signal; receive a CA signal associated with a continuous long burst PRBS pattern;

perform a CBT based at least in part on the CA signal in relation to the CK signal; and provide pass/fail results associated with the CBT.

In some aspects, the interface between the host device 110 and the memory device 120 may be associated with CBT. The CBT may be based at least in part on a CA signal in relation to a CK signal, where the CA signal may be associated with a continuous long burst PRBS pattern. The continuous long burst PRBS pattern may be any length, but for robust training, the length may be approximately a 1K-4K bit pattern length. The CA signal may be associated with a binary sequence that, while generated with a deterministic algorithm, may be difficult to predict and exhibit statistical behavior similar to a truly random sequence.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM.

The host device 110 may be any device configured to control operations of the memory device 120. For example, the host device 110 may include control logic, a memory controller, a system controller, an ASIC, an FPGA, a processor, a microcontroller, and/or one or more processing components.

As indicated above, FIG. 1 is provided as an example. Other examples may differ from what is described with regard to FIG. 1.

Figure 2:
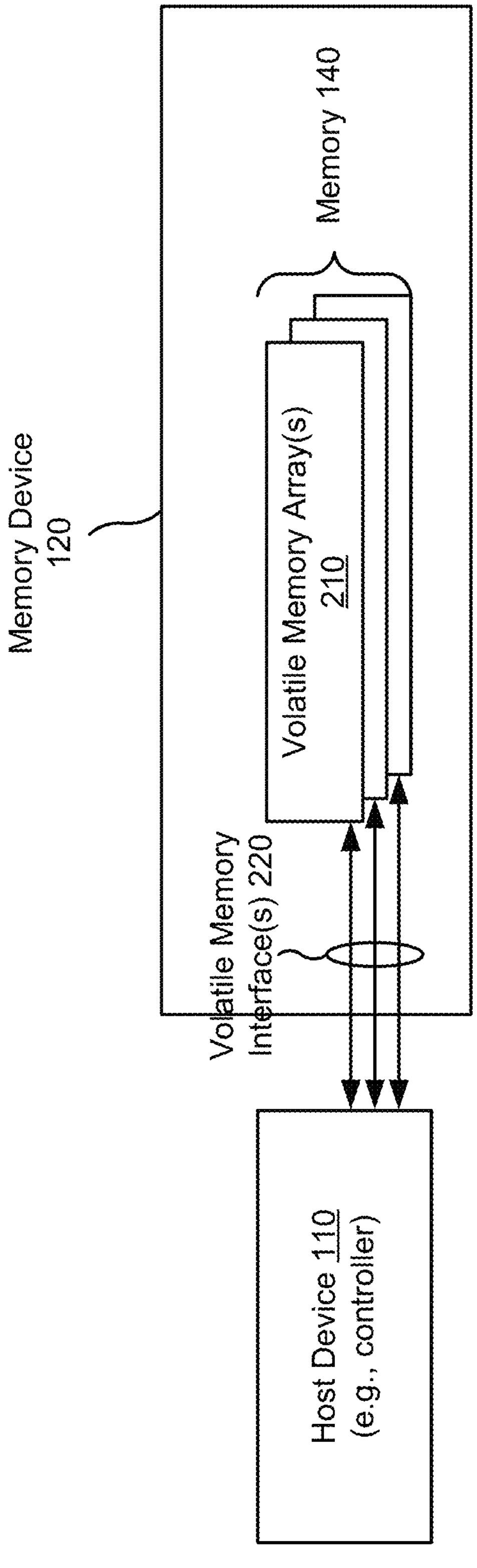
FIG. 2 is a diagram of example components included in a memory device.

FIG. 2 is a diagram of example components included in a memory device 120. As described above in connection with FIG. 1, the memory device 120 may include memory 140. As shown in FIG. 2, the memory 140 may include one or more volatile memory arrays 210, such as one or more SRAM arrays and/or one or more DRAM arrays. A host device 110 may transmit signals to and receive signals from a volatile memory array 210 using a volatile memory interface 220. The volatile memory interface 220 may be associated with CBT.

The host device 110 may control operations of the memory 140, such as by executing one or more instructions. For example, the memory device 120 may store one or more instructions in the memory 140 as firmware, and the host device 110 may execute the one or more instructions. In some implementations, a non-transitory computer-readable medium (e.g., volatile memory and/or non-volatile memory) may store a set of instructions (e.g., one or more instructions or code) for execution by the host device 110. The host device 110 may execute the set of instructions to perform one or more operations or methods described herein. In some implementations, execution of the set of instructions, by the host device 110, causes the host device 110 and/or the memory device 120 to perform one or more operations or methods described herein. In some implementations, hardwired circuitry is used instead of or in combination with the one or more instructions to perform one or more operations or methods described herein. Additionally, or alternatively, the host device 110 and/or one or more components of the memory device 120 may be configured to perform one or more operations or methods described herein. An instruction is sometimes called a "command."

One or more devices or components shown in FIG. 2 may be configured to perform operations described herein, such as one or more operations and/or methods described in connection with FIGS. 3-9. For example, the controller 130, the memory management component 225, may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

LPDDR, or LPDDR SDRAM, may be a type of synchronous DRAM consuming relatively low power and targeted for mobile devices. An LPDDR may be associated with a maximum density (bits), a memory array clock, a prefetch size, memory densities, an I/O bus clock frequency, a data transfer rate, a supply voltage, and/or a command/address bus. LPDDR5 may support a maximum speed of approximately 2.4 Gbps, whereas LPDDR6 may support a maximum speed of approximately 6.4 Gbps.

Figure 3:
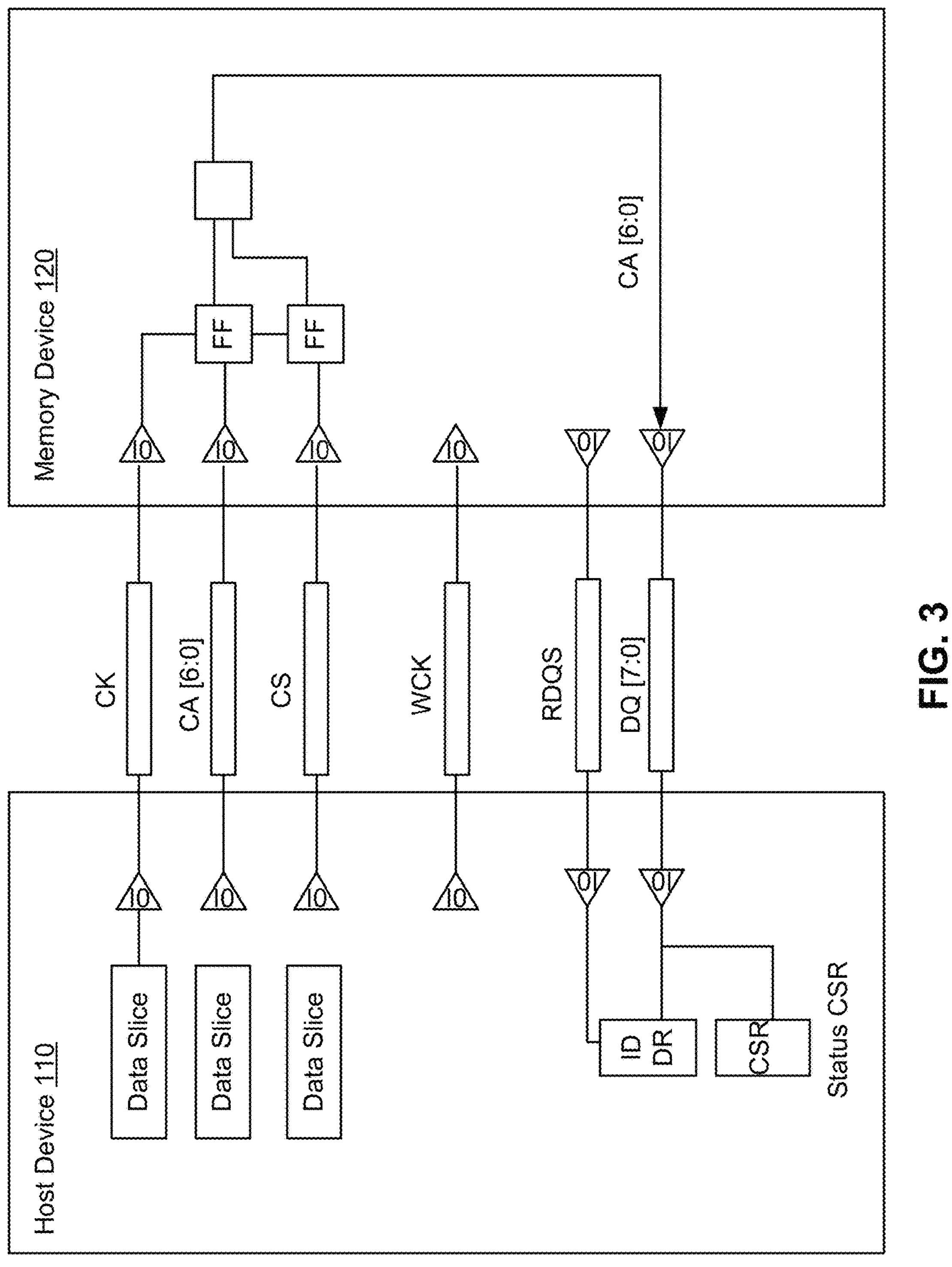
FIG. 3 is a diagram illustrating an example of CBT for low-power double data rate 5 (LPDDR5), in accordance with the present disclosure.

FIG. 3 is a diagram illustrating an example 300 of CBT for LPDDR5, in accordance with the present disclosure.

A host device 110 may include one or more processors configured to execute instructions and store data in the memory device 120. For example, the host device 110 may include a central processing unit (CPU), a graphics processing unit (GPU), a field-programmable gate array (FPGA), an application-specific integrated circuit (ASIC), and/or another type of processing component (not shown). The host device 110 and the memory device 120 may be included in any electronic device configured to store data in a memory of the memory device 120. For example, the host device 110 and the memory device 120 may be associated with a computer, a mobile phone, a wired or wireless communication device, a network device, a server, a device in a data center, a device in a cloud computing environment, a vehicle (e.g., an automobile or an airplane), and/or an Internet of Things (IoT) device.

The memory device 120 may be any electronic device or circuitry configured to store data in memory. In some implementations, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM.

As shown in FIG. 3, the host device 110 (e.g., a system-on-chip (SOC)) may send, via a command interface, commands/signals to a memory 140 (e.g., DRAM). The commands/signals may include a CK signal, a CA signal (e.g., comprising 7 bits of information), a CS signal, and/or a write clock (WCK) signal. The CS signal may be used as a valid signal. The memory 140 may decode such commands/signals. The memory 140 may respond with a read data strobe (RDQS) signal and/or a data in or out (DQ) signal.

As indicated above, FIG. 3 is provided as an example. Other examples may differ from what is described with regard to FIG. 3.

Figure 4:
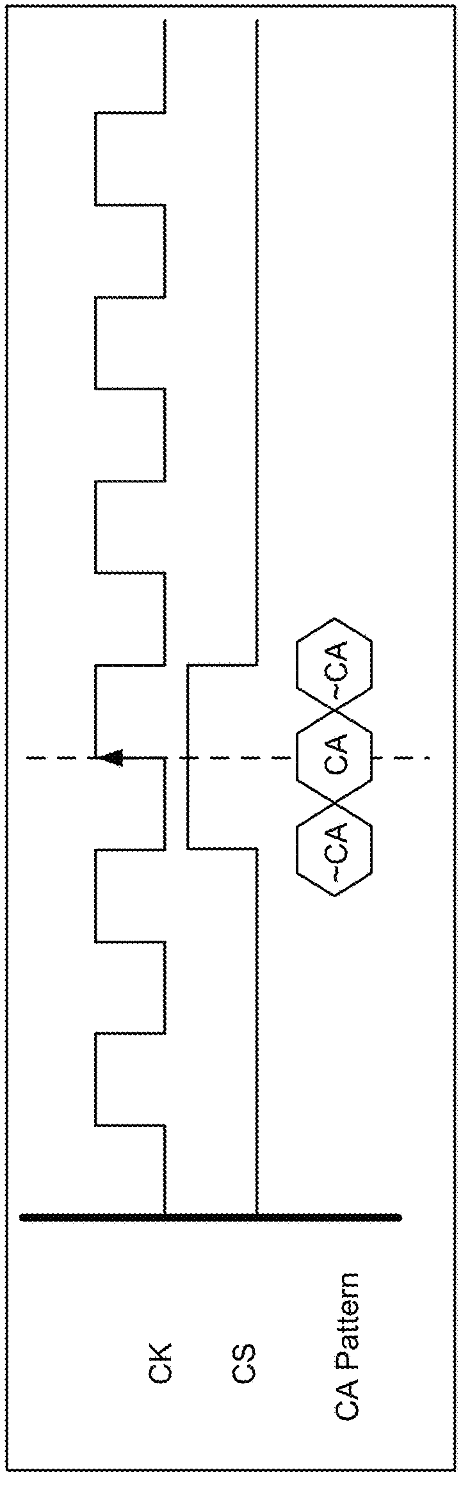
FIG. 4 is a diagram illustrating an example of rise edge training, in accordance with the present disclosure.

FIG. 4 is a diagram illustrating an example 400 of rise edge training, in accordance with the present disclosure. As shown in FIG. 4, in a rise edge training for LPDDR5, for data associated with a rising edge of a CK signal, the CK signal should be placed at the center of data associated with a CA pattern, which may provide a sufficient margin on both sides of a command. As indicated above, FIG. 4 is provided as an example. Other examples may differ from what is described with regard to FIG. 4.

Figure 5:
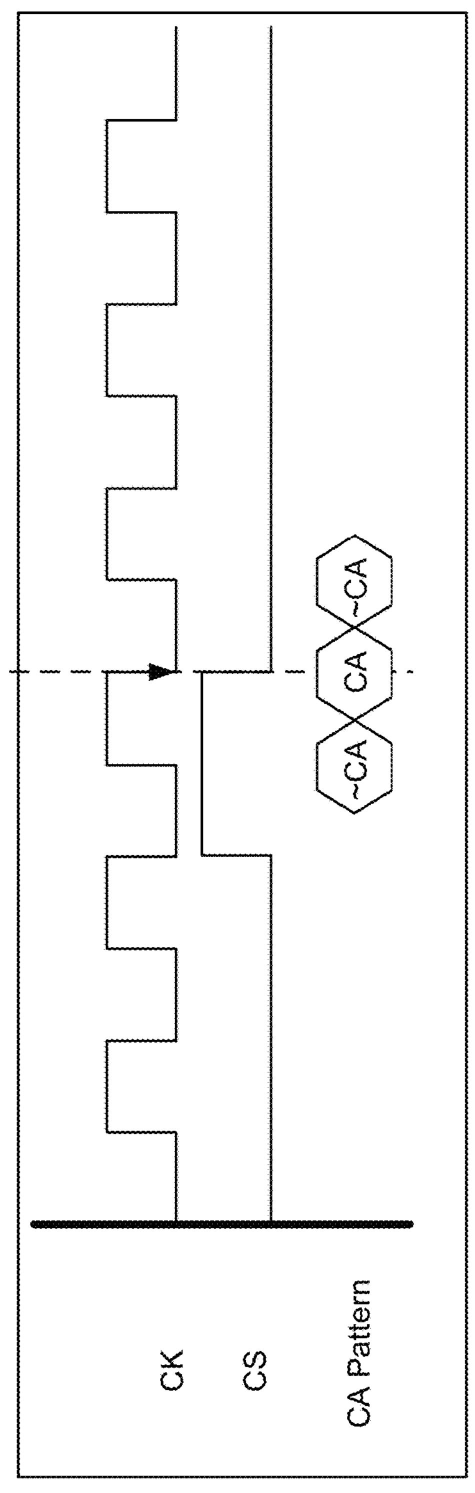
FIG. 5 is a diagram illustrating an example of fall edge training, in accordance with the present disclosure.

FIG. 5 is a diagram illustrating an example 500 of fall edge training, in accordance with the present disclosure. As shown in FIG. 5, in a fall edge training for LPDDR5, for data associated with a falling edge of a CK signal, the CK signal should be placed at the center of data associated with a CA pattern, which may provide a sufficient margin on both sides of a command. As indicated above, FIG. 5 is provided as an example. Other examples may differ from what is described with regard to FIG. 5.

Figure 6:
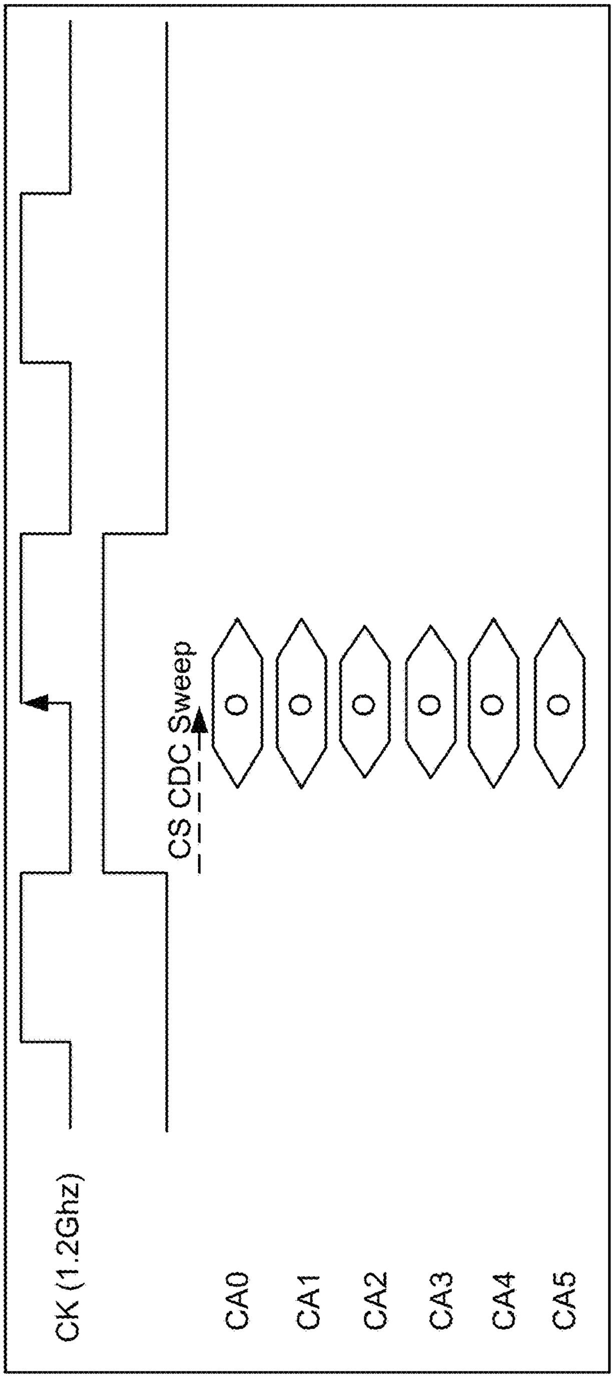
FIG. 6 is a diagram illustrating an example of a chip select (CS) sweep, in accordance with the present disclosure.

FIG. 6 is a diagram illustrating an example 600 of a CS sweep, in accordance with the present disclosure. As shown in FIG. 6, a CS may be used as a valid signal to indicate to a DRAM that a command is valid. The CS should be trained, such that the CS is at a center of a CK signal, which may ensure a proper margin on both sides of the CS. The CS sweep may allow the CS to be placed at the center of the CK. Thus, the CS and CA(s) may be placed at the center of the CK. As indicated above, FIG. 6 is provided as an example. Other examples may differ from what is described with regard to FIG. 6.

A CBT for LPDDR5 (e.g., as shown in FIG. 3) may use a CA to DQ mapping for a return pass/fail read out. For example, a CA number (e.g., CA6, CA5, CA4, CA3, CA2, CA1, or CA0) may be mapped to a DQ number (e.g., DQ6, DQ5, DQ4, DQ3, DQ2, DQ1, or DQ0). A DQ may output a CA pattern latched by a CK rising edge (default). The DQ may output a CA pattern latched by a CK falling edge.

The CBT may be used to ensure that a CK signal is at the center of CA bits (data of command). The CBT may involve sending only a phase (or portion) of data (e.g., phase 0 or phase 1). Phase 0 may refer to CA latched with the CK rising edge, and phase 1 may refer to CA latched with the CK falling edge, where the two phases may refer to two portions of data (e.g., rising edge and falling edge). CBT may involve two phases of training, which may correspond to phase 0 and phase 1. The data may be on the rising edge of the CK or on the falling edge of the CK. The data may be relatively long, for example, due to a back-to-back data burst. The limitation of only sending the phase (or portion) of data each time may result in less exhaustive training, which may be acceptable for the relatively low speed associated with LPDDR5. However, for LPDDR6, which may be associated with a higher speed than LPDDR5, such an approach may lead to improper training. Rise edge training and fall edge training may not be suitable for the relatively high speed associated with LPDDR6. As a result, applying the CBT to LPDDR6 may degrade an overall system performance.

In some aspects, a memory device, such as a volatile memory device (e.g., DRAM) may receive, from a host device, a CK signal. The volatile memory device may receive, from the host device, a CA signal associated with a continuous long burst PRBS pattern. The volatile memory device may perform a CBT based at least in part on the CA signal in relation to the CK signal. The CBT may be performed on a per-bit basis and/or a per-phase basis of the CA signal. The volatile memory device may provide pass/fail results associated with the CBT. The pass/fail results may include, in parallel, pass/fail information on the per-bit basis. The pass/fail results may include rise and fall pass/fail information on the per-phase basis.

In some aspects, the CBT may involve receiving the CA signal. The CBT may involve comparing the CA signal to the CK signal to obtain pass or fail results. The CBT may involve using the pass or fail results to adjust (e.g., train) properties of a command bus, such as a signaling delay at the host device and/or a reference voltage of a receiver of the memory device.

In some aspects, the memory device may receive, from the host device, the CK signal. The memory device may receive, from the host device, the CA signal, which may comprise a burst PRBS pattern. The burst PRBS pattern may be the continuous long burst PRBS pattern. The memory device may perform a comparison of the CA signal and the CK signal. The memory device may adjust sender and/or receiver signaling parameters (e.g., CA-signal sender delay, CA-signal receiver reference voltage (Vref), etc.) based on the comparison of the CA signal and the CK signal. The memory device may provide, to the host device, results of the comparison associated with the CBT, or the memory device may adjust a CA signal reception parameter. The memory device may send the results of the comparison to the host device to enable an adjustment of sender parameters, such as CA signal delay.

In some aspects, a robust training option may be required for LPDDR6 CBT to cover ISI, cross-talk, and/or voltage noise. A coverage may be improved by using the continuous long burst PRBS pattern. The continuous long burst PRBS pattern may be suitable for the relatively high speed associated with LPDDR6 (e.g., 6.4 Gbps), versus the relatively low speed associated with LPDDR5 (e.g., 2.4 Gbps) which does not implement the continuous long burst PRBS pattern. The continuous long burst PRBS pattern may address ISI, cross-talk, and/or voltage noise. As a result, by using the continuous long burst PRBS pattern, a training associated with LPDDR6 may be improved, thereby improving an overall system performance.

In some aspects, for LPDDR6, by employing the continuous long burst PRBS pattern for training, a phase 0/1 in parallel may be supported, a phase 0/1 pass/fail may be supported, a per-bit pass/fail may be supported, a long CA burst back-to-back may be supported, a voltage reference training and noise training may be improved with the continuous long burst PRBS, crosstalk may be improved with the continuous long burst PRBS, ISI may be improved with the continuous long burst PRBS, reflection may be improved with the continuous long burst PRBS, and training time may be improved with a dynamic frequency sequence. On the other hand, in a legacy CBT for LPDDR5, the phase 0/1 in parallel is not supported, the long CA burst back-to-back is not supported, the voltage reference training and noise training is not robust, the crosstalk is not robust, the ISI is not robust, and the reflection is not robust.

Figure 7:
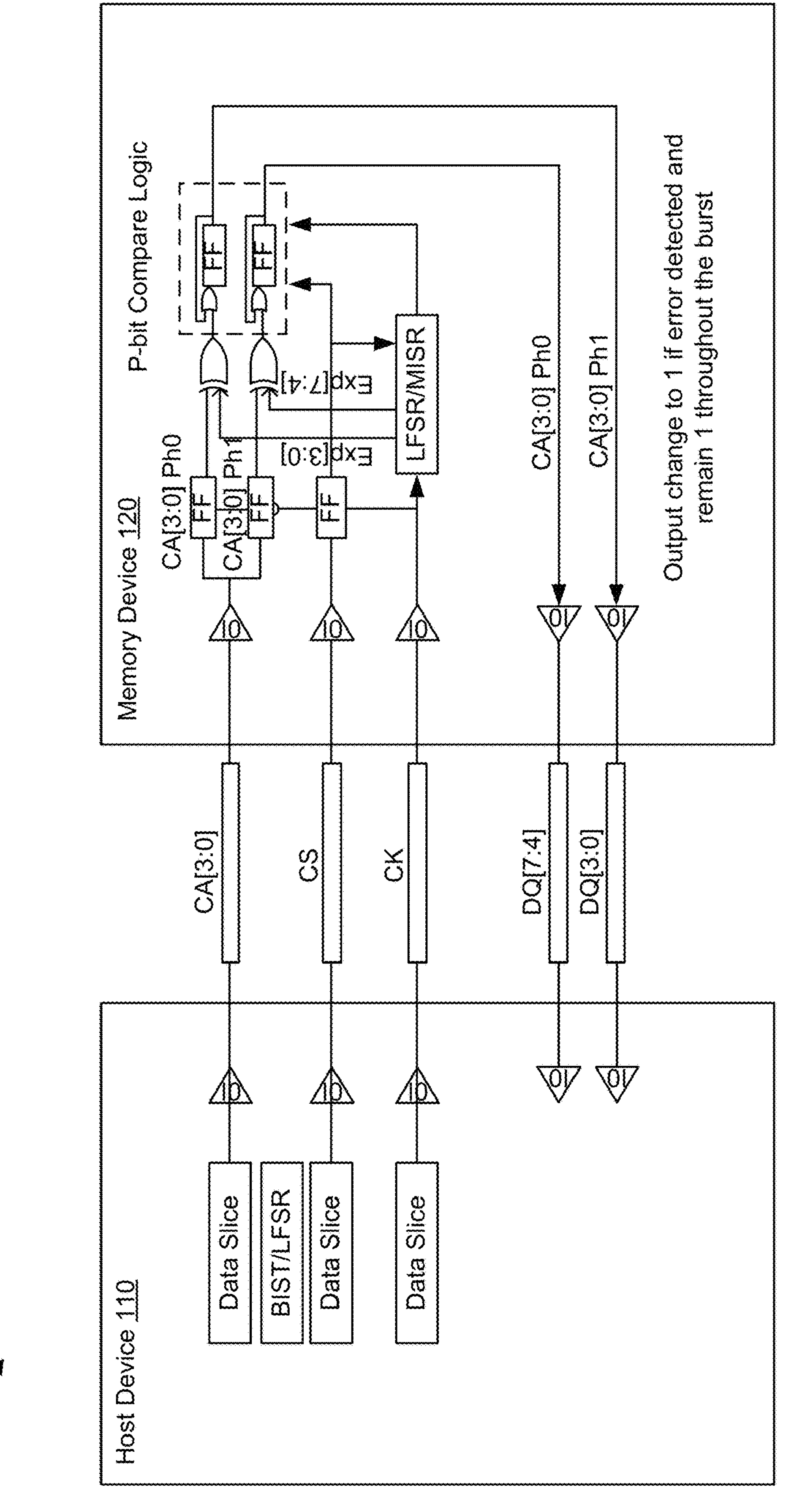
FIG. 7 is a diagram illustrating an example of performing CBT for a memory system, in accordance with the present disclosure.

FIG. 7 is a diagram illustrating an example 700 of performing CBT for a memory system, in accordance with the present disclosure. The operations described in connection with FIG. 7 may be performed by the memory device 120 and/or one or more components of the memory device 120, such as the controller 130 and/or one or more components of the controller 130. The memory device 120 may be a volatile memory device. The volatile memory device may be associated with LPDDR6.

As shown in FIG. 7, the memory device 120 may receive from a host device 110, a CK signal. The memory device 120 may receive, from the host device 110, a CS signal. The memory device 120 may receive, from the host device 110, a CA signal associated with a continuous long burst PRBS pattern. The CA signal may be received when the CS signal is associated with a high value. The memory device 120 may perform a CBT based at least in part on the CA signal in relation to the CK signal. The memory device 120, when performing the CBT, may compare each bit or phase of the CA signal to the CK signal. The comparison may be done on every clock cycle. The CBT may provide training for ISI, cross-talk, and/or voltage noise. The memory device 120 may provide, to the host device 110, pass/fail results associated with the CBT. The pass/fail results may be provided via a DQ bus. A first DQ signal may be associated with a phase or bit associated with no error (e.g., phase 0), and a second DQ signal may be associated with a phase or bit associated with an error (e.g., phase 1). In some aspects, the memory device 120 may perform the CBT on a per-bit basis of the CA signal. The pass/fail results may include, in parallel, pass/fail information on the per-bit basis. The memory device 120 may perform the CBT on a per-phase basis of the CA signal. The pass/fail results may include rise and fall pass/fail information on the per-phase basis. The CBT may be associated with an adjustment of a per-bit skew and a duty cycle distortion.

In some aspects, the host device 110 (e.g., an SOC) may send commands/signals to the memory device 120, such as a DRAM, which may include a CK signal, a CA signal, and/or a CS signal. A built-in self-test (BIST) and/or a linear-feedback shift register (LFSR) at the host device 110 may be used to generate a continuous long burst PRBS pattern, which may be applied to the CA signal. Alternatively, a pseudo-random pattern generator may be used to generate the continuous long burst PRBS pattern, which may be applied to the CA signal. A matching LFSR or multiple-input signature register (MISR) (e.g., with a same predefined seed sequence) may be at the memory device 120. The CS signal may become high, and then the host device 110 may send the CA signal with the continuous long burst PRBS pattern. At every clock cycle, the memory device 120 may check if any bits associated with the CA signal are in error. An error may occur when a particular bit is not at a center of a CK. The memory device 120 may include compare logic which may compare the bits to the CA signal. The compare logic may output 0 and 1 in parallel, which may be provided to the host device 110. When an error is detected, an output may be changed to 1, and the output may remain 1 throughout the burst. Detecting the error may change the state of the burst. 0 may be associated with no error, whereas 1 may be associated with error. 0 and 1 may be based on a CA to DQ mapping. For example, passed bits and failed bits may be indicated in a corresponding DQ signal. As a result, the SOC may become aware of particular bits that have failed.

In some aspects, a CBT training may be performed on a per-bit and per-phase manner to adjust a per-bit skew and duty cycle distortion. The CBT training in the per-bit manner may provide each bit pass/fail information in parallel. The CBT training in the per-phase manner may provide rise and fall pass/fail information. The SOC may send a long CA burst with a high CS. The long CA burst may involve various patterns back-to-back (e.g., 1k, 2k, or 4k bit patterns). The memory device 120 may have an LFSR/MISR with matching data to compare each phase/bit and return an error on a DQ bus. An LFSR/MISR function may be associated with a predefined seed sequence for PRBS, and a matching LFSR/MISR on the memory device 120 and the host device 110 may be defined. The memory device 120 may include the compare logic to monitor continuous data on every clock cycle and record the error if any of the CA bits fail. The memory device 120 may provide pass/fail results for each phase via the DQ bus. For example, CA [3:0]Ph0 may be associated with DQ [7:4] (for phase 0), and CA [3:0]Ph1 may be associated with DQ [3:0] (for phase 1). A 0 on the DQ bus may indicate a pass, whereas a 1 on the DQ bus may indicate a fail. DQ8 may be used for entry/exit functions. A remaining DQ [11:9] may be undefined. Phase 0 (CK rising edge) and phase 1 (CK falling edge) as a CA training may be associated with a double data rate. CA data may be latched on both rising and falling edges. Since the CBT training is performed in parallel for both rising and falling edges, an error may have to log from rising data and falling data, which may be sent back to the DQ bus in parallel. In other words, a first half of the DQ bus may be used for rise data error and a second half of the DQ bus may be used for fall data error.

In some aspects, to determine an error of the CA bits, a binary sequence, instead of a CK signal, generated by a predefined seed sequence associated with the LFSR/MISR may be compared with each bit of a received CA signal associated with the continuous long burst PRBS pattern. A comparison result may be used to indicate whether the CK signal is at a center of the CA signal. For example, when the binary sequence generated by the predefined seed sequence is consistent with the CA signal associated with the continuous long burst PRBS pattern, the CK signal may be indicated to be at a center of the CA signal. When the binary sequence generated by the predefined seed sequence is not consistent with the CA signal, the CK signal may be indicated to not be at a center of the CA signal.

As indicated above, FIG. 7 is provided as an example. Other examples may differ from what is described with regard to FIG. 7.

Figure 8:
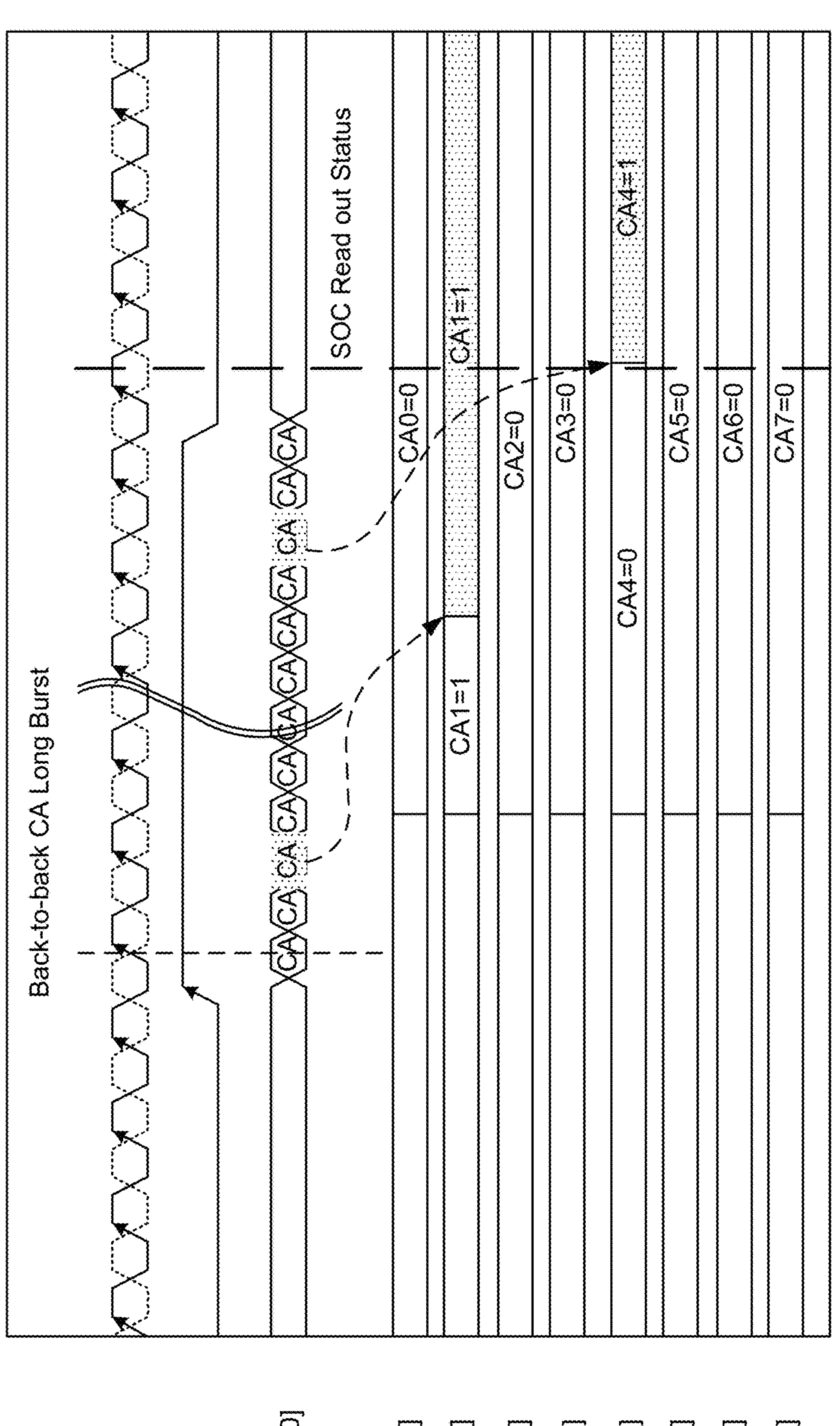
FIG. 8 is a diagram illustrating an example of performing CBT for a memory system, in accordance with the present disclosure.

FIG. 8 is a diagram illustrating an example 800 of performing CBT for a memory system, in accordance with the present disclosure.

As shown in FIG. 8, a CA signal associated with a continuous long burst PRBS pattern may be transmitted. The CA signal may be transmitted along with a CK signal and a CS signal. When the CS signal is high, the CA signal may be transmitted. When a bit associated with the CA signal is not in error (e.g., the bit is at a center of the CK signal), then an output of 0 may be mapped to a particular DQ signal (for an entirety of the burst). When a bit associated with the CA signal is in error (e.g., the bit is not at a center of the CK signal), then an output of 1 may be mapped to a particular DQ signal. The various DQ signals may indicate an SOC read out status.

As indicated above, FIG. 8 is provided as an example. Other examples may differ from what is described with regard to FIG. 8.

Figure 9:
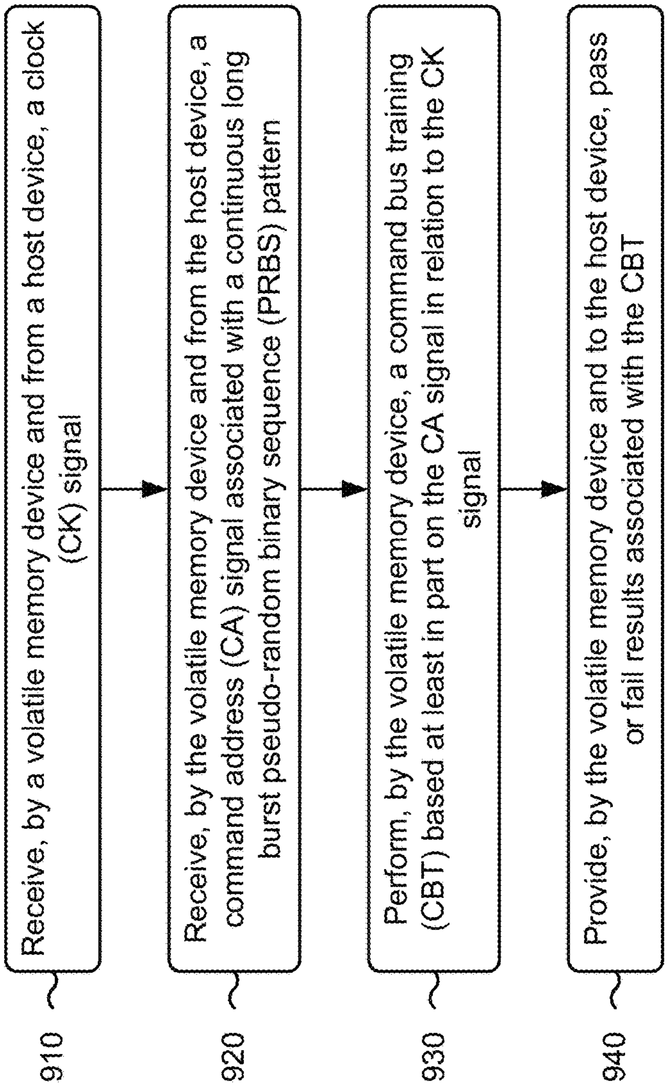
FIG. 9 is a flowchart of an example method associated with performing CBT for a memory system.

FIG. 9 is a flowchart of an example process 900 associated with performing CBT for a memory system. In some implementations, one or more process blocks of FIG. 9 are performed by a memory device (e.g., memory device 120). In some implementations, one or more process blocks of FIG. 9 are performed by another device or a group of devices separate from or including the memory device, such as a host device (e.g., host device 110).

As shown in FIG. 9, process 900 may include receiving, from a host device, a CK signal (block 910). For example, the memory device may receive, from the host device, a CK signal, as described above.

As further shown in FIG. 9, process 900 may include receiving, from the host device, a CA signal associated with a continuous long burst PRBS pattern (block 920). For example, the memory device may receive, from the host device, a CA signal associated with a continuous long burst PRBS pattern, as described above.

As further shown in FIG. 9, process 900 may include performing a CBT based at least in part on the CA signal in relation to the CK signal (block 930). For example, the memory device may perform a CBT based at least in part on the CA signal in relation to the CK signal, as described above.

As further shown in FIG. 9, process 900 may include providing, to the host device, pass/fail results associated with the CBT (block 940). For example, the memory device may provide, to the host device, pass/fail results associated with the CBT, as described above.

Process 900 may include additional implementations, such as any single implementation or any combination of implementations described below and/or in connection with one or more other processes described elsewhere herein.

In a first implementation, process 900 includes comparing each bit or phase of the CA signal to the CK signal, wherein a comparison is done on every clock cycle.

In a second implementation, alone or in combination with the first implementation, the pass/fail results are provided via a DQ bus, a first DQ signal is associated with a phase or bit associated with no error, and a second DQ signal is associated with a phase or bit associated with an error.

In a third implementation, alone or in combination with one or more of the first and second implementations, the CBT is performed on a per-bit basis of the CA signal, and the pass/fail results includes, in parallel, pass information or fail information on the per-bit basis.

In a fourth implementation, alone or in combination with one or more of the first through third implementations, the CBT is performed on a per-phase basis of the CA signal, and the pass/fail results includes rise pass/fail information or fall pass/fail information on the per-phase basis.

In a fifth implementation, alone or in combination with one or more of the first through fourth implementations, the CBT is associated with an adjustment of a per-bit skew and a duty cycle distortion.

In a sixth implementation, alone or in combination with one or more of the first through fifth implementations, process 900 includes receiving, from the processor, a CS signal, wherein the CA signal is received when the CS signal is associated with a high value.

In a seventh implementation, alone or in combination with one or more of the first through sixth implementations, the volatile memory device includes an LFSR, and the LFSR is associated with a same predefined seed sequence as compared to an LFSR associated with the host device.

In an eighth implementation, alone or in combination with one or more of the first through seventh implementations, the CBT provides training for one or more of inter-symbol interference, cross-talk, or voltage noise.

In a ninth implementation, alone or in combination with one or more of the first through eighth implementations, the volatile memory device is associated with LPDDR6.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method, comprising: receiving, by a volatile memory device and from a host device, a clock (CK) signal; receiving, by the volatile memory device and from the host device, a command address (CA) signal associated with a continuous long burst pseudo-random binary sequence (PRBS) pattern; performing, by the volatile memory device, a command bus training (CBT) based at least in part on the CA signal in relation to the CK signal; and providing, by the volatile memory device and to the host device, pass or fail results associated with the CBT.

Aspect 2: The method of Aspect 1, wherein performing the CBT comprises comparing each bit or phase of the CA signal to the CK signal, wherein a comparison is done on every clock cycle.

Aspect 3: The method of any of Aspects 1-2, wherein the pass or fail results are provided via a data in or out (DQ) bus, a first DQ signal is associated with a phase or bit associated with no error, and a second DQ signal is associated with a phase or bit associated with an error.

Aspect 4: The method of any of Aspects 1-3, wherein the CBT is performed on a per-bit basis of the CA signal, and the pass or fail results includes, in parallel, pass information or fail information on the per-bit basis.

Aspect 5: The method of any of Aspects 1-4, wherein the CBT is performed on a per-phase basis of the CA signal, and the pass or fail results includes rise pass or fail information or fall pass or fail information on the per-phase basis.

Aspect 6: The method of any of Aspects 1-5, wherein the CBT is associated with an adjustment of a per-bit skew and a duty cycle distortion.

Aspect 7: The method of any of Aspects 1-6, further comprising receiving, from the host device, a chip select (CS) signal, wherein the CA signal is received when the CS signal is associated with a high value.

Aspect 8: The method of any of Aspects 1-7, wherein the volatile memory device includes a linear-feedback shift register (LFSR), and the LFSR is associated with a same predefined seed sequence as compared to an LFSR associated with the host device.

Aspect 9: The method of any of Aspects 1-8, wherein the CBT provides training for one or more of: inter-symbol interference, cross-talk, or voltage noise.

Aspect 10: The method of any of Aspects 1-9, wherein the volatile memory device is associated with low-power double data rate 6 (LPDDR6).

Aspect 11: An apparatus at a device, the apparatus comprising one or more processors; one or more memories coupled with the one or more processors; and instructions stored in the one or more memories and executable by the one or more processors to cause the apparatus to perform the method of one or more of Aspects 1-10.

Aspect 12: An apparatus at a device, the apparatus comprising one or more memories and one or more processors coupled to the one or more memories, the one or more processors configured to cause the device to perform the method of one or more of Aspects 1-10.

Aspect 13: An apparatus, the apparatus comprising at least one means for performing the method of one or more of Aspects 1-10.

Aspect 14: A non-transitory computer-readable medium storing code, the code comprising instructions executable by one or more processors to perform the method of one or more of Aspects 1-10.

Aspect 15: A non-transitory computer-readable medium storing a set of instructions, the set of instructions comprising one or more instructions that, when executed by one or more processors of a device, cause the device to perform the method of one or more of Aspects 1-10.

Aspect 16: A device, the device comprising a processing system that includes one or more processors and one or more memories coupled with the one or more processors, the processing system configured to cause the device to perform the method of one or more of Aspects 1-10.

Aspect 17: An apparatus at a device, the apparatus comprising one or more memories and one or more processors coupled to the one or more memories, the one or more processors individually or collectively configured to cause the device to perform the method of one or more of Aspects 1-10.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A volatile memory device, comprising:

one or more components configured to:

receive, from a host device, a clock (CK) signal;

receive, from the host device, a command address (CA) signal associated with a continuous long burst pseudo-random binary sequence (PRBS) pattern;

perform a command bus training (CBT) based at least in part on the CA signal in relation to the CK signal; and provide, to the host device via a first a data in or out (DQ) bus and a second DQ bus, pass or fail results associated with the CBT, wherein the pass or fail result in the first DQ bus corresponds to the CA signal latched with a rising edge of the CK signal and the pass or fail result in the second DQ bus corresponds to the CA signal latched with a falling edge of the CK signal.

2. The volatile memory device of claim 1, wherein a length of the continuous long burst PRBS pattern is based at least in part on a range of one thousand to four thousand bits.

3. The volatile memory device of claim 1, wherein the CBT is associated with an adjustment of a per-bit skew and a duty cycle distortion.

4. The volatile memory device of claim 1, wherein the one or more components are further configured to receive, from the host device, a chip select (CS) signal, wherein the CA signal is received when the CS signal is associated with a high value.

5. The volatile memory device of claim 1, wherein the volatile memory device includes a linear-feedback shift register (LFSR), and the LFSR is associated with a same predefined seed sequence as compared to an LFSR associated with the host device.

6. The volatile memory device of claim 1, wherein the CBT provides training for one or more of: inter-symbol interference, cross-talk, or voltage noise.

7. The volatile memory device of claim 1, wherein the volatile memory device is associated with low-power double data rate 6 (LPDDR6).

8. The volatile memory device of claim 1, wherein the one or more components further configured to:

receive, from the host device, one or more additional CA signals;

perform the CBT further based on the one or more additional CA signals in relation to the CK signal; and provide, to the host device via one or more first additional DQ buses and one or more second additional DQ buses, pass or fail results associated with the CBT.

9. The volatile memory device of claim 8, wherein the CBT based on the CA signals in relation to the CK signal and the CBT based on the one or more additional CA signals in relation to the CK signal are performed in parallel.

10. The volatile memory device of claim 8, wherein the CA signal is CA [0], the first DQ bus is DQ [0], the second DQ bus is DQ [4], the one or more additional CA signals are CA [1:3], the one ore more first additional DQ buses are DQ [1:3], and the one or more second additional DQ buses are DQ [5:7].

11. The volatile memory device of claim 8, wherein the pass or fail results in the one or more first additional DQ buses correspond to the one or more additional CA signals latched with the rising edge of the CK signal and the pass or fail results in the one or more second DQ buses correspond to the one or more additional CA signals latched with the falling edge of the CK signal.

12. The volatile memory device of claim 1, wherein the one or more components further configured to receive an entry or exit function of the CBT via a third DQ signal.

13. A method, comprising:

receiving, by a volatile memory device and from a host device, a clock (CK) signal;

receiving, by the volatile memory device and from the host device, a command address (CA) signal associated with a continuous long burst pseudo-random binary sequence (PRBS) pattern;

performing, by the volatile memory device, a command bus training (CBT) based at least in part on the CA signal in relation to the CK signal; and providing, by the volatile memory device and to the host device via a first a data in or out (DQ) bus and a second DQ bus, pass or fail results associated with the CBT, wherein the pass or fail result in the first DQ bus corresponds to the CA signal latched with a rising edge of the CK signal and the pass or fail result in the second DQ bus corresponds to the CA signal latched with a falling edge of the CK signal.

14. The method of claim 13, wherein a length of the continuous long burst PRBS pattern is based at least in part on a range of one thousand to four thousand bits.

15. The method of claim 13, wherein the CBT is associated with an adjustment of a per-bit skew and a duty cycle distortion.

16. The method of claim 13, further comprising receiving, from the host device, a chip select (CS) signal, wherein the CA signal is received when the CS signal is associated with a high value.

17. The method of claim 13, wherein the volatile memory device includes a linear-feedback shift register (LFSR), and the LFSR is associated with a same predefined seed sequence as compared to an LFSR associated with the host device.

18. The method of claim 13, wherein the CBT provides training for one or more of: inter-symbol interference, cross-talk, or voltage noise.

19. The method of claim 13, wherein the volatile memory device is associated with low-power double data rate 6 (LPDDR6).

20. A system, comprising:

a host device configured to:

transmit a clock (CK) signal; and transmit a command address (CA) signal associated with a continuous long burst pseudo-random binary sequence (PRBS) pattern; and a memory device configured to:

receive the CK signal;

receive the CA signal;

perform a command bus training (CBT) based at least in part on the CA signal in relation to the CK signal; and provide to the host device via a first a data in or out (DQ) bus and a second DQ bus pass or fail results associated with the CBT, wherein the pass or fail result in the first DQ bus corresponds to the CA signal latched with a rising edge of the CK signal and the pass or fail result in the second DQ bus corresponds to the CA signal latched with a falling edge of the CK signal.

21. The system of claim 20, wherein a length of the continuous long burst PRBS pattern is based at least in part on a range of one thousand to four thousand bits.

22. The system of claim 20, wherein the CBT is associated with an adjustment of a per-bit skew and a duty cycle distortion.

23. The system of claim 20, wherein the memory device is further configured to receive a chip select (CS) signal, wherein the CA signal is received when the CS signal is associated with a high value.

24. The system of claim 20, wherein the memory device includes a linear-feedback shift register (LFSR), and the LFSR is associated with a same predefined seed sequence as compared to an LFSR associated with the host device.

25. The system of claim 20, wherein the CBT provides training for one or more of: inter-symbol interference, cross-talk, or voltage noise.

26. The system of claim 20, wherein the memory device is associated with low-power double data rate 6 (LPDDR6).

* * * * *